United States Patent [19]

Brishka et al.

[11] 4,111,514
[45] Sep. 5, 1978

[54] POLARIZING KEYING DEVICE FOR ELECTRICAL CONNECTORS

[75] Inventors: Alexander R. Brishka, Irvine; David W. DeChamp, Westminster, both of Calif.

[73] Assignee: International Telephone and Telegraph Corporation, New York, N.Y.

[21] Appl. No.: 809,412

[22] Filed: Jun. 23, 1977

[51] Int. Cl.² ............................................. H01R 13/64
[52] U.S. Cl. ................................................. 339/186 R
[58] Field of Search .................. 339/186, 187; 285/18, 285/29

[56] References Cited

U.S. PATENT DOCUMENTS

| 1,953,594 | 4/1934 | Douglas | 339/187 |
| 2,933,711 | 4/1960 | Eaton | 339/187 X |
| 3,194,588 | 7/1965 | Buckey et al. | 339/186 R X |

Primary Examiner—Joseph H. McGlynn
Assistant Examiner—E. F. Desmond
Attorney, Agent, or Firm—Thomas L. Peterson

[57] ABSTRACT

An inexpensively manufactured discrete keying device for connector, plugs and sockets of standard types. Two or more mating grooves and finger members are coded by discretely spacing them circumferentially. The grooves are axial and are cut into the turnable captive internally threaded body shell member of one matable subassembly of the connector arrangement and the finger members are radially inwardly directed projections having matching circumferential spacing within the wall of a sleeve member associated with the other connector subassembly. Where a plurality of such connectors are adjacent to each other, mismating is prevented by separate finger and groove spacings for each corresponding connector assembly.

2 Claims, 9 Drawing Figures

POLARIZING KEYING DEVICE FOR ELECTRICAL CONNECTORS

BACKGROUND OF THE INVENTION

1. Field of the Invention

The invention relates generally to electrical connectors and, more particularly, to electrical connectors which are not discretely self-keying.

2. Description of the Prior Art

Whenever two or more plug and socket pairs, each comprising the subassemblies of a connector arrangement, are located adjacent to each other, there is always the possibility that the various connector plugs may not be mated to the sockets for which they were intended, through human error. This is particularly true where these connections are located in difficult access positions, which is often the case in aircraft applications, or the like. If the connectors are of the single cable coaxial type, for example, there is nothing about the connector subassemblies (plug and socket halves) themselves which would prevent mismating, since the corresponding subassemblies are frequently identical parts.

Although there are such things as "polarized" coaxial connectors, these are limited to situations where there are just two coaxial connections to be considered at any one location.

Even in multi-pin connectors, any "keying" provided is usually for rational alignment purposes and cannot prevent the inadvertent mismating of identical plug and socket connector subassemblies.

A particular prior art approach to providing discrete mating, where there is a plurality of coaxial connections to be made in a given location, is described in U.S. Pat. No. 3,194,588, entitled "Key Connector for Plugs and Sockets Having Noninterchangeable Coupling Means." In that device, a "cage-like" device, having internal axially extending ribs, is employed. These ribs are affixed to or are integral with a backing plate and an outer ring. The said backing plate contains a central hole, preferably threaded, to engage the body threads of one subassembly of a connector arrangement (for example, the socket member of a mating coaxial connector pair). An annular groove in those threads may be provided so that the "cage" may be advanced to the point where the threaded hole in the backing plate fits loosely on one part of one connector subassembly. The internal threaded connector body member which would normally engage the threads of the socket member to mate the two subassemblies contains axial grooves in the same number as the aforementioned internal ribs of the "cage" and having the same circumferential spacing. In order to mate the two parts of the connector arrangement, these grooves must engage the cage ribs to permit the required axial closure movement necessary to effect connector mating. Adjacent connectors of the same type may have the keying (coding) provided by the discrete circumferential groove and rib spacings varied to that only like keyed arrangements can be made.

It will be apparent to those skilled in the manufacturing arts that the aforementioned prior art device is expensive to manufacture. Copper-based alloys are normally employed for connector part of the type employed in the connectors with which the invention is concerned, molded plastic or other substitute materials being usually regarded as unsuitable for the application due to the strength and durability considerations.

The manner in which the present invention addresses the general problem of high manufacturing costs to provide a novel improvement in devices of the character described will be evident as this description proceeds.

SUMMARY

It may be said to be the general objective of the present invention to provide a combination of cooperating parts to permit the correct mating of connector subassemblies (plugs and sockets), using a simple additional part which is easily and economically manufactured and a prior art modification of one of the standard connector elements.

The function of the combination of the present invention is comparable to that of U.S. Pat. No. 3,194,588; however, the "cage" part employed in that prior art device is replaced by a "cup-like" device with inwardly formed fingers taking the place of the internal ribs employed in the prior art device. The particular part referred to in the present combination may be fabricated by well-known processes, since it is basically in the shape of a cup having a cylindrical (sleeve) wall and a plain disc bottom. Basically, such shapes may be fabricated very economically on programmed turret lathe equipment or automatic screw machines, from bar or heavy wall tubular stock. A central, coaxial, threaded hole in the "bottom" of the cup shape may be formed in the same manufacturing sequence. Thereafter, the radially inwardly directed "fingers" may be formed in the correct circumferential spacing as predetermined in a one or two-step forming process according to well known machine shop techniques. The details of the novel structure and its relationship to the other parts of the structure will be understood as this description proceeds.

DESCRIPTION OF THE PREFERRED EMBODIMENT

Figure 1:
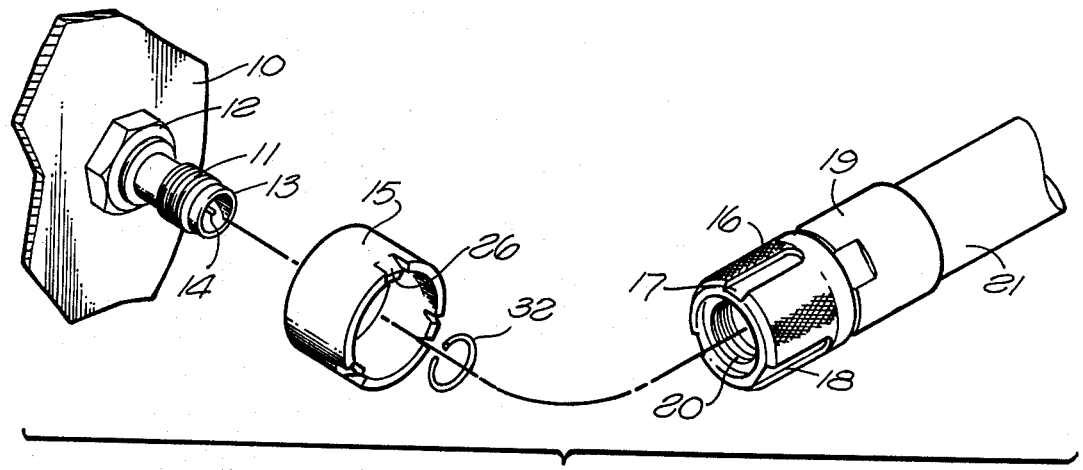
FIG. 1 is an exploded pictorial illustrating the invention in a form in which the internally threaded rotatable connector body member contains axial grooves discretely coded (keyed) by circumferential spacing of the grooves.

Referring now to FIG. 1, an exploded pictorial view of an arrangement according to the present invention shows one mating connector subassembly mounted through a panel or bulkhead 10 in a well understood manner. This half of a connector arrangement shows the outer tubular conductor 13 and the inner conductor 14 of a typical coaxial connector. The internal threads 20 on the rotatable body member 16 of the mating connector subassembly engages threads 11 in the fully mated condition, this being the usual situation in the prior art.

The bulkhead-mounted connector subassembly showing coaxial outer conductor 13 and inner conductor 14 would indicate that the mating part within 19 is the "socket" half, whereas 13 and 14 constitute the plug or male half. Insofar as the present invention is concerned, this is arbitrary but largely in keeping with industry conventions. The freely rotating body member or internally threaded body shell 16 contains axially extending grooves, typically 17 and 18. In order to provide the discrete coding (keying) which is required in connection with the present invention, at least two such grooves must be used. However, three or more grooves provide a more secure coding or keying in much the same manner as indicated in the aforementioned U.S. Pat. No. 3,194,588. The sleeve member 15, which fits with axial constraint but rotational freedom over the bulkhead-mounted connector subassembly, has a plurality of radially inwardly directed fingers, typically 26, the circumferential spacing of which matches the grooves in 16. A retaining ring 32 is inserted after 15 is in place. FIGS. 2, 3, 7 and 8 show the emplacement of this ring in the embodiments hereinafter more fully described.

Figure 2:
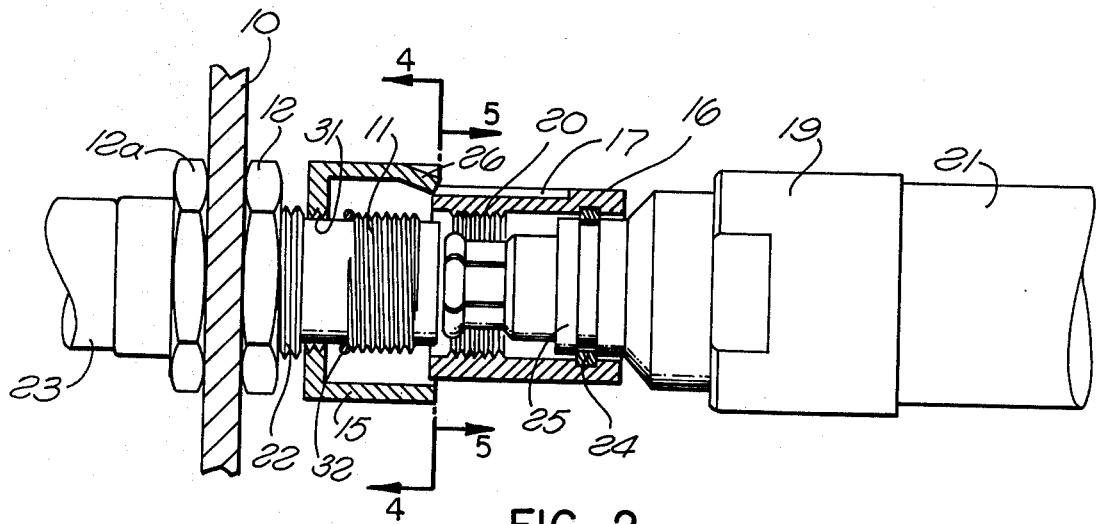
FIG. 2 is a partially sectioned view of the arrangement of FIG. 1 as the parts relate prior to engagement (mating).

A coaxial cable 21 is shown associated with the inner connector body 19 on the right side of FIG. 1, and a similar cable 23 is associated with the other connector subassembly behind the panel as will be seen on FIG. 2.

As previously indicated, the present invention is useful with coaxial and, in particular, other symmetrical connectors. However, its use is by no means precluded with multi-pin connectors, perhaps of identical types, in a given location.

As illustrated in FIG. 1, the coaxial connector parts may typically be of the series TNC, N, RL, HN, or SC series, or the like, as those designations are understood in the connector trade. In addition to the provision of the sleeve member 15, the body member 16 is modified by the provision of the grooves, typically 17 and 18; but otherwise, the connectors are standard parts available in the trade.

Referring now to FIG. 2, the bulkhead-mounted connector subassembly is more fully depicted. Mounting nuts 12 and 12a engage threads 22 for secure mounting. These threads 22 may have the same outside diameter as threads 11 (and the same thread pitch), however, this is not necessarily true, since the outside diameter of threads 22 may be slightly larger so that the nut 12 can clear over threads 11 for faster installation.

The threads 31 in the "bottom" of sleeve member 15 engage the threads 11 during its installation and actually pass over beyond threads 11 into the free space between threaded portions 11 and 22. From FIG. 2, the part 15 is obviously a "cup-shaped" part with a hole in its "bottom" having threads 31. The radially inwardly directed fingers, typically 26, will be seen to be formed by very simple manufacturing techniques; i. e., in a punching operation or by first making cuts on either side and subsequent inwardly bending, such as by a punch and die arrangement. The manufacturing cost for the part 15 will be understood at this point to be much less than that of the part contemplated in the aforementioned U.S. Pat. No. 3,194,588.

In FIG. 2, the connector subassemblies are shown just before they are completely mated and as the radially inwardly directed fingers on 15 are just beginning to engage the grooves in 16. Parts 25 and 19 are part of the standard connector body, as is the rotatable connector body member 16, the latter being held in place axially by a retainer ring 24, resting in circumferential grooves in 25 and 16. The part 16 is, of course, freely rotatable, the retainer ring 24 allowing this rotation.

Figure 4:
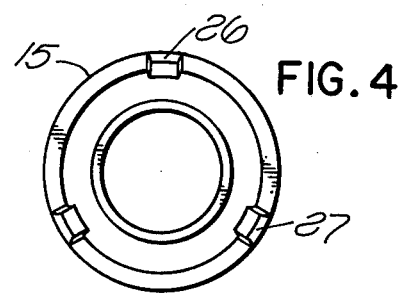
FIGS. 4 and 5 are axial views taken in accordance with the sectioning arrows on FIGS. 2 and 7.
Figure 5:
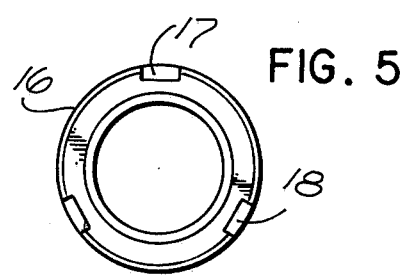

FIGS. 4 and 5, respectively, are provided to clearly illustrate the nature of the inwardly directed fingers, typically 26 and 27 on the part 15 and the corresponding grooves 17, 18, etc. on 16.

Figure 3:
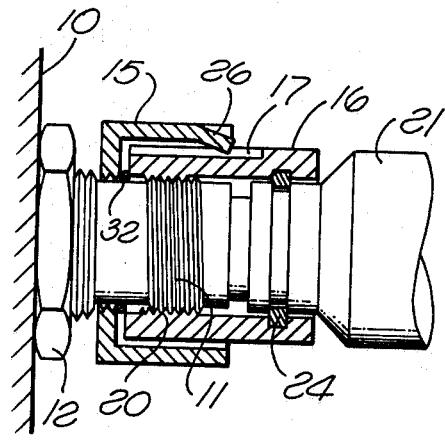
FIG. 3 illustrates a portion of the apparatus of FIG. 2 showing the relationship of parts in the fully engaged or mated condition.

Referring now to FIG. 3, the parts depicted in FIG. 2 are shown fully mated; i.e., with the threads 20 fully engaged with the threads 11. FIG. 3 is otherwise self-explanatory, the identification of various elements being identical with that of FIG. 2.

Figure 6:
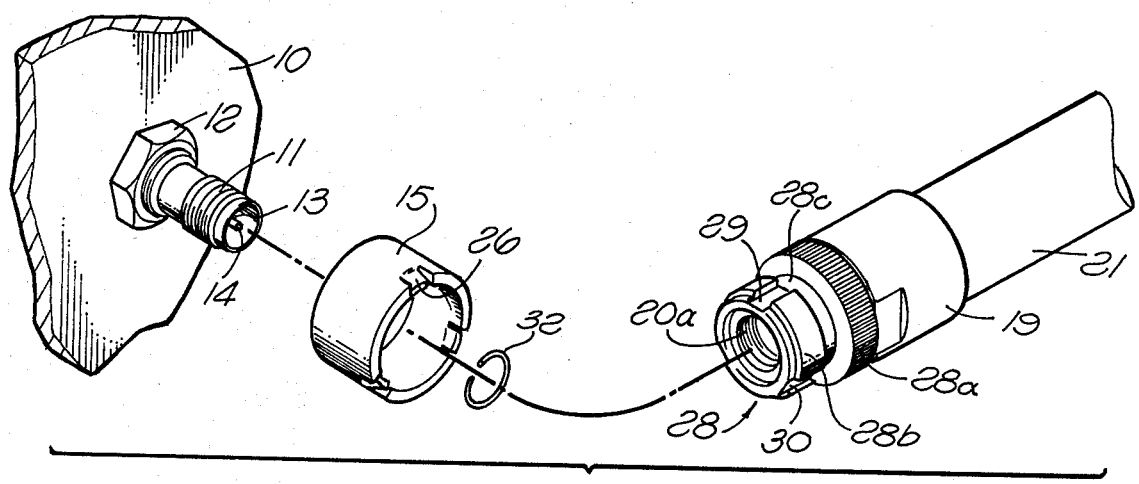
FIG. 6 is an exploded pictorial illustrating a second embodiment of the present invention in which a portion of the coaxial connector body of FIG. 1 is replaced by a discretely keyed mating sleeve which allows free rotation of the keyed mating sleeve associated with the socket member in the fully mated or engaged condition.
Figure 7:
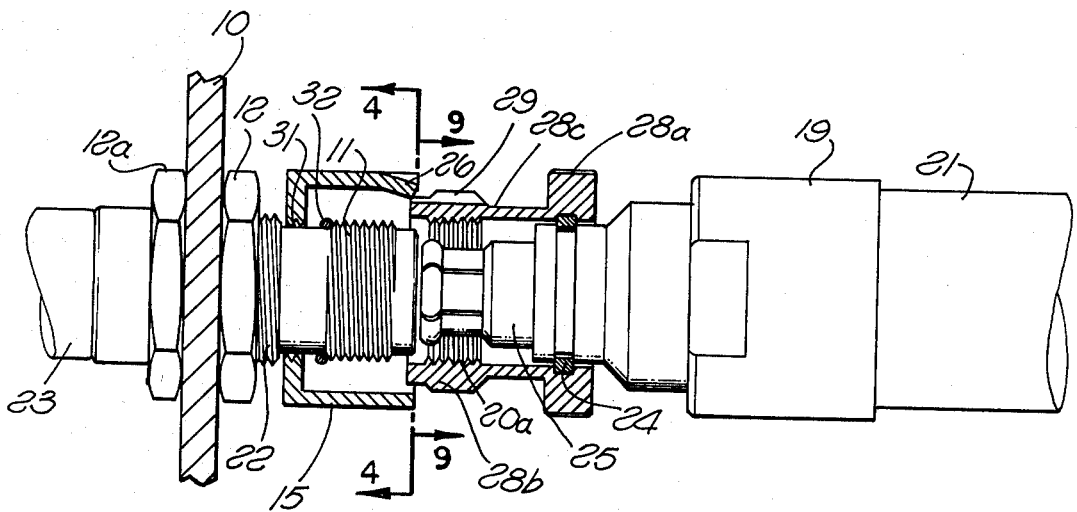
FIG. 7 is a partially sectioned view of the apparatus of FIG. 6 showing the relationships of parts just prior to engagement or mating.
Figure 8:
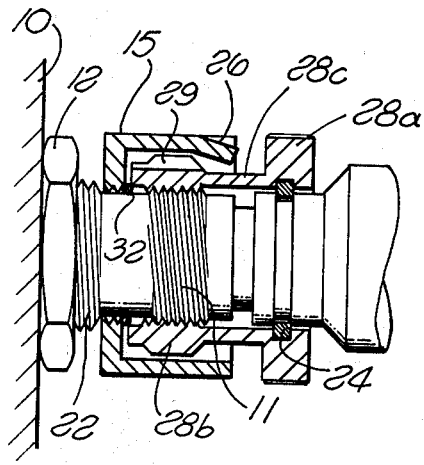
FIG. 8 shows a portion of the apparatus of FIG. 7 to illustrate the relationship of the parts in the fully mated or engaged condition.
Figure 9:
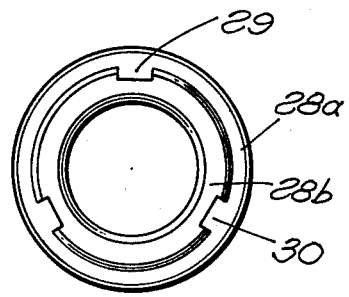
FIG. 9 is a view in accordance with the corresponding sectioning arrow on FIG. 7.

Referring now to FIG. 6, an additional embodiment, according to the invention, is illustrated. In this embodiment, the internally threaded body part 16 associated with the other body parts 19 and 25 has been replaced by a part 28, as shown in FIG. 6. This part 28 has the same circumferentially spaced, axially extending grooves, typically 29 and 30, directly comparable to grooves 17 and 18 on FIG. 1. The part is free to be rotated manually, and a knurled portion 28a is provided for that purpose. Part 28 is a direct replacement for the part 16, the standard connector subassembly being modified by removal of the retainer ring 24, as shown in FIG. 2; removal of 16 entirely; and thereafter, by substituting 28 for 16 and reinstalling the retainer ring 24. Accordingly, from FIGS. 7 and 8, the forward annular portion of the part 28 will be seen to be identified as 28b, there being a smaller diameter circumferential groove 28c between 28a and 28b.

The aforementioned forward annular ring portion 28b contains essentially the same three axial grooves as are depicted (FIG. 5, especially) in the first embodiment, these being identified as 29 and 30 on FIGS. 6, 7, 8 and 9. The significant difference, however, is that the axial length of these grooves is shorter, since they are interrupted by the circumferential groove 28c. This circumferential groove provides a free rotation space in which the aforementioned inwardly directed fingers on part 15 may freely pass as the part 15 itself is rotated with respect to 28. This arrangement permits several additional options. For example, in certain installation situations, it may be easier to turn the sleeve member 15 to affect engagement with the grooves of the connector body being inserted, or it may be more convenient to have the part 15 constructed to have its threads 31 engage the threads 22 to bring it into a fixed axial and rotational position with respect to bulkhead 10. Turning the part 28 via the knurled finger surface of 28a can, in that case, permit proper orientation of 28 to match the keying grooves thereof with the finger portions of 15 and, thereafter, to permit rotation of 28 to complete the engagement of threads 20 and 11 after a partial engagement is effected by an axially applied insertion force to locate the fingers 26 in the groove 28c.

It will be evident that part 15 is inherently stronger than the "cage" part of the prior art, especially in the configuration where only two of the inwardly directed fingers are required.

The parts 16 and 28 may also be referred to as body shells or body shell members, and the radially inwardly directed fingers may also be referred to as tabs. The axial dimension or direction referred to is, of course, a dimension parallel to the coaxial conductors; i.e., the direction of thrust in mating the two connector subassemblies. Other common language and terms used interchangeably in the specification and claims will be readily understood by those skilled in this art.

Certain modifications and variations in the novel structure described will suggest themselves to those skilled in this art. For example, pin and cam slot securing means can take the place of threads 20, 20a and 11, such arrangements being well known in this art. Where minimization of weight is important, it will be realized that the part 15 can be made of relatively thin material and in fact could include a plurality of lightening holes through its circumferential wall and for its "bottom" surface. Accordingly, it is not intended that the drawings of this description should be considered as limiting the scope of the invention, these being regarded as typical and illustrative only.

What is claimed is:

1. A device for discretely keying first and second matable connectors to prevent unintended mismating where a plurality of such connectors are located in the same vicinity, said first matable connector including a first body shell with first external surface engagement means and said second matable connector including a rotatable captive second body shell extending axially over said first body shell during mating of said connectors, said second body shell including second engagement means on the inside surface thereof for securing said first and second connectors in the mated position, comprising:
   first means comprising a plurality of axial grooves within the external surface of said second body shell, said grooves having a discrete predetermined circumferential spacing;
   an annular channel within the external surface of said second body shell behind said grooves;
   second means comprising a key member surrounding and rotatable relative to said first body shell, said key member having an inside diameter greater than the outside diameter of said second body shell and a plurality of radially inwardly directed keys at the front of said key member spaced to correspond to said axial grooves in said second body shell and to engage said grooves when said connectors are mated and to prevent axial mating of said connectors if said grooves and keys do not correspond for at least one rotational relationship between said second body shell and said key member;
   means for restricting rotation of said key member relative to said first body shell; and
   said keys being positioned in said channel during mating of said first and second connectors to allow rotation of said second body shell relative to said first body shell.

2. A device as set forth in claim 1 wherein:
   said rotation restricting means comprises internal threads within the inside surface of said key member adjacent to the rear thereof, and mating external threads on said first body shell spaced behind said first external surface engagement means.

* * * * *